United States Patent [19]

Nakano

[11] Patent Number: 4,479,184
[45] Date of Patent: Oct. 23, 1984

[54] DEVICE FOR MAINTAINING A CONSTANT VEHICLE SPEED

[75] Inventor: Jiro Nakano, Okazaki, Japan

[73] Assignee: Toyota Jidosha Kogyo Kabushiki Kaisha, Toyota, Japan

[21] Appl. No.: 286,717

[22] Filed: Jul. 24, 1981

[30] Foreign Application Priority Data

Nov. 5, 1980 [JP] Japan ............................. 55-154573

[51] Int. Cl.³ .................. G05D 13/58; F02M 23/04
[52] U.S. Cl. .......................... 364/424; 364/431.07; 364/426; 180/179; 123/350
[58] Field of Search ............. 364/424, 426, 431.07, 364/431.01; 123/350, 352, 361, 360; 180/170, 176, 178, 179

[56] References Cited

U.S. PATENT DOCUMENTS

| | | | |
|---|---|---|---|
| 3,869,019 | 3/1975 | Cardani | 180/176 |
| 3,946,707 | 3/1976 | Gray | 123/352 X |
| 4,138,723 | 2/1979 | Nehmer et al. | 364/426 X |
| 4,219,000 | 8/1980 | Locher et al. | 180/170 X |
| 4,240,145 | 12/1980 | Yano et al. | 364/431.07 |
| 4,306,527 | 12/1981 | Kumugawa et al. | 123/327 X |
| 4,344,399 | 8/1982 | Matsumura et al. | 364/431.07 X |
| 4,374,422 | 2/1983 | O'Keefe, Jr. et al. | 364/426 |

FOREIGN PATENT DOCUMENTS 54-59509 5/1979 Japan ................................. 123/339

Primary Examiner—Felix D. Gruber
Assistant Examiner—Ronni S. Malamud
Attorney, Agent, or Firm—Cushman, Darby & Cushman

[57] ABSTRACT

An intake system of an engine comprising a main intake passage which has a throttle valve therein. The throttle valve is controlled by a main actuator. An auxiliary intake passage is branched off from the main intake passage located upstream of the throttle valve and is connected to the main intake passage located downstream of the throttle valve. An auxiliary valve, controlled by a subactuator, is arranged in the auxiliary intake passage. The vehicle speed is controlled by the main actuator when the vehicle speed is too increased or too reduced relative to a set speed to be maintained. Contrary to this, the vehicle speed is controlled by the subactuator when the vehicle speed is maintained at a speed near the set speed.

23 Claims, 15 Drawing Figures

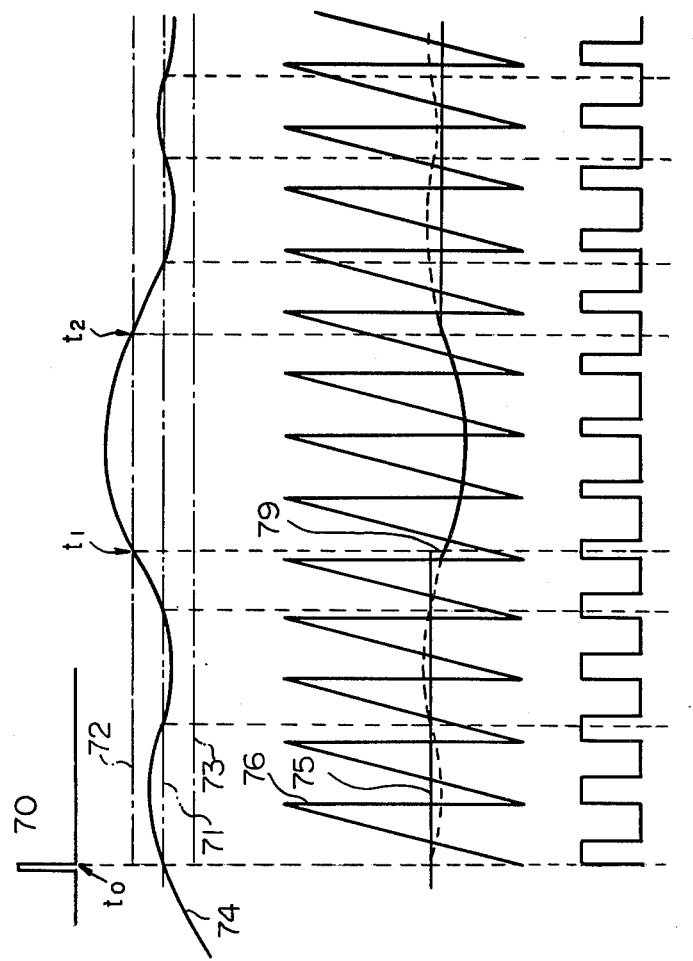

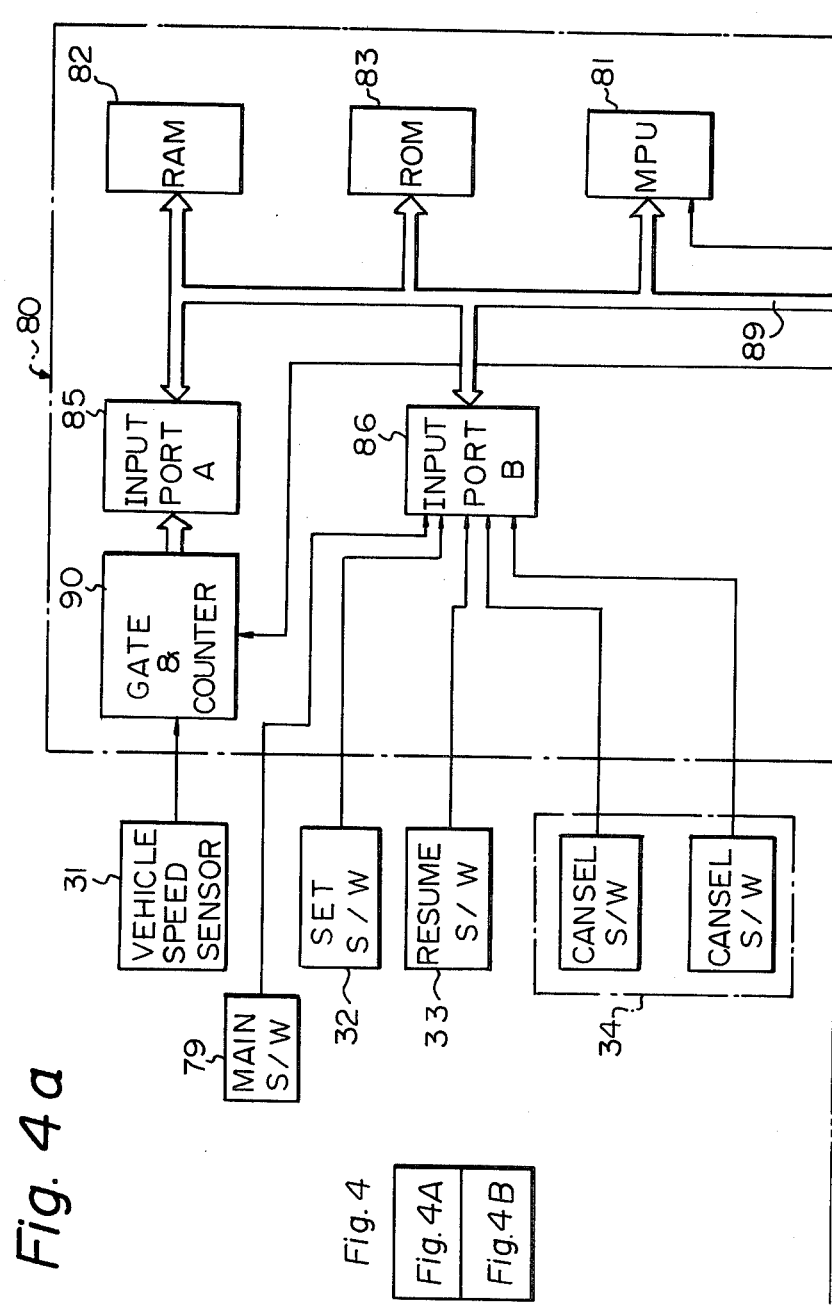

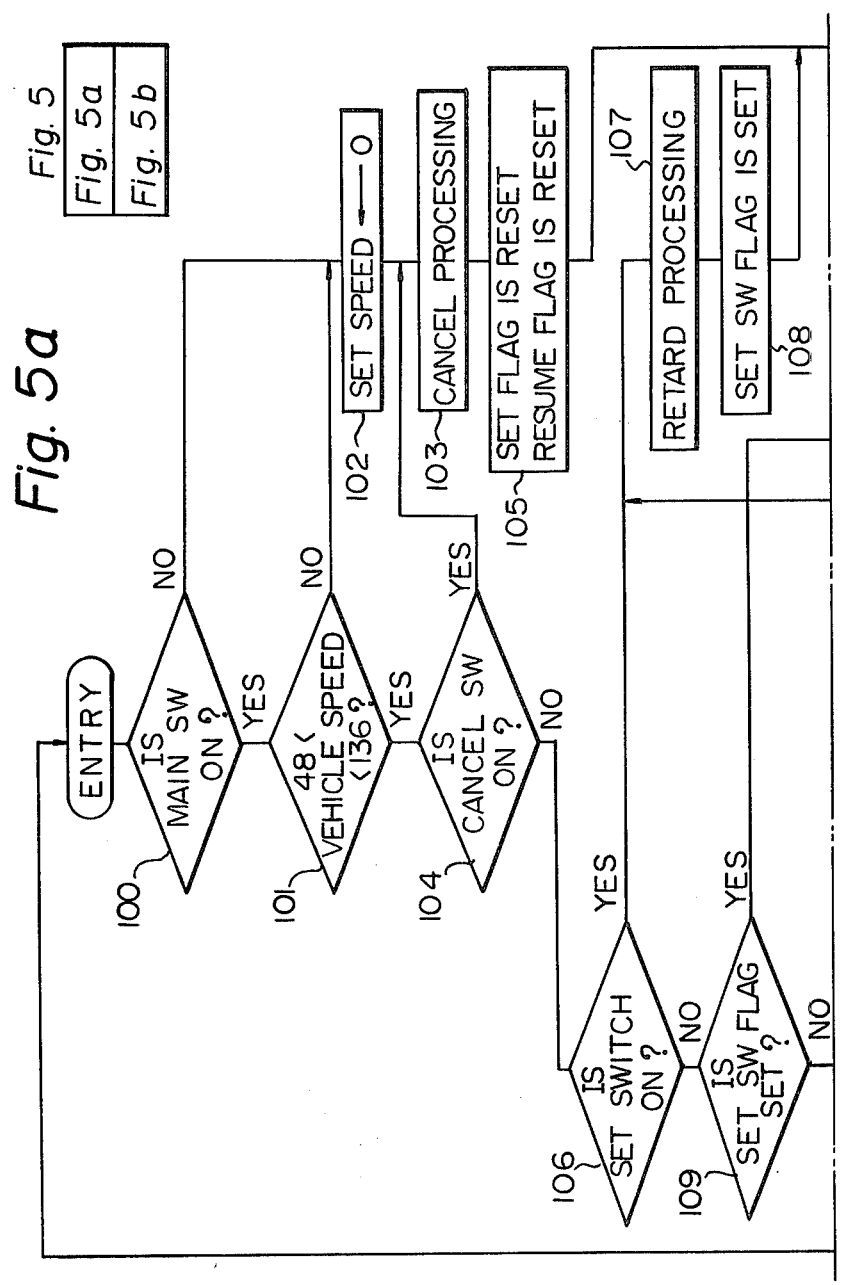

DEVICE FOR MAINTAINING A CONSTANT VEHICLE SPEED

DESCRIPTION OF THE INVENTION

The present invention relates to a device which can maintain a vehicle speed at a constant (hereinafter referred to as a speed maintaining device).

In a conventional speed maintaining device, an actuator is connected to the throttle lever link of a throttle value arranged in the intake passage of an engine, and continuous pulses are applied to the solenoid of the actuator. The opening degree of the throttle valve is increased as the duty cycle of the continuous pulses applied to the solenoid of the actuator is increased. In addition, the opening degree of the throttle valve is controlled by the actuator so that a vehicle is driven at a constant speed. However, since such a conventional speed maintaining device includes a loose-fitting throttle link mechanism, even if the opening degree of the throttle valve is the same, the duty cycle of the continuous pulse applied to the solenoid of the actuator when the opening operation of the throttle valve is carried out is different from the duty cycle of the continuous pulse applied to the solenoid of the actuator when the closing operation of the throttle valve is carried out. In the case wherein the opening degree of the throttle valve is increased as the duty cycle of the continuous pulses is increased, the duty cycle of the continuous pulses applied to the solenoid when the opening operation of the throttle valve is carried out becomes larger than the duty cycle of the continuous pulses applied to the solenoid when the closing operation of the throttle valve is carried out. Consequently, in the case when the opening degree of the throttle valve is alternately increased and reduced relative to a given opening degree for maintaining a constant vehicle speed and, for example, in the case wherein, after the throttle valve is rotated in the closing direction and closed to a certain degree, the throttle valve is rotated again in the opening direction from such a certain degree, then the duty cycle of the continuous pulses applied to the solenoid when the throttle valve is closed to the above-mentioned certain degree is smaller than the duty cycle of the continuous pulses, which is necessary to rotate the throttle valve in the opening direction from the above-mentioned certain degree. Consequently, even if the duty cycle of the continuous pulses is increased for opening the throttle valve after the throttle valve is rotated in the closing direction, the throttle valve is not rotated in the opening direction for a little while. As a result of this, during this time, the speed of the vehicle is gradually reduced. After this, when the throttle valve begins to be rotated in the opening direction, the increasing operation of the vehicle speed is started.

On the other hand, in the case wherein, after the throttle valve is rotated in the opening direction, the throttle valve is rotated again in the closing direction, even if the duty cycle of the continuous pulses is reduced for closing the throttle valve after the throttle valve is rotated in the opening direction, and the throttle valve is not rotated in the closing direction for a little while. As a result of this, during this time, the speed of the vehicle is gradually increased. After this, when the throttle valve begins to be rotated in the closing direction, the reducing operation of the vehicle speed is started. Therefore, the speed of the vehicle is alternately increased and reduced relative to a set speed to be maintained and, thus, the fluctuation in the speed of the vehicle occurs. Such a fluctuation remarkably occurs particularly when the controlling operation for maintaining a vehicle speed at a constant is started. In addition, in the case wherein the controlling operation for maintaining a vehicle speed at a constant is carried out, when the vehicle comes to a descending stop and, thus, the opening degree of the throttle valve is slightly reduced, the above-mentioned fluctuation also occurs.

An object of the present invention is to provide a speed maintaining device capable of suppressing the fluctuation in the speed of the vehicle and precisely controlling the speed of the vehicle.

According to the present invention, there is provided a speed maintaining device of a vehicle, comprising: a main intake passage having therein a throttle valve for controlling the amount of air fed into an engine; a main actuator connected to said throttle valve for controlling the opening degree of said throttle valve; an auxiliary intake passage branched off from said main intake passage upstream of said throttle valve and connected to said main intake passage downstream of said throttle valve, said auxiliary intake passage having therein an auxiliary valve for controlling the amount of air flowing within said auxiliary intake passage; a subactuator connected to said auxiliary valve for controlling the flow area of said auxiliary valve; vehicle speed detecting means for detecting a vehicle speed at which the vehicle is now driven; memory means for storing the vehicle speed as a set speed to be maintained on the basis of a driver's indication; discriminating means for comparing the vehicle speed and the set speed to produce discriminating signals representating whether the vehicle speed is within a range between a predetermined upper limit and a predetermined lower limit which are higher and lower than said set speed, respectively; main arithmetic control means in response to said discriminating signals for actuating said main actuator to minimize a speed difference between the vehicle speed and the set speed when the vehicle speed is not within said range, and; subarithmetic control means in response to said discriminating signals for actuating said subactuator to minimize said speed difference when the vehicle speed is within said range.

The present invention may be more fully understood from the description of preferred embodiments of the invention set forth below, together with the accompanying drawings.

BRIEF DESCRIPTION OF THE DRAWINGS

In the drawings:

FIGS. 3a–3g are diagrams for illustration of the operation of the electronic control circuit in FIG. 2;

FIGS. 4a and 4b are circuit diagrams of an alternative embodiment of an electronic control circuit according to the present invention;

FIGS. 5a and 5b are flow charts for illustration of the operation of the electronic control circuit in FIGS. 2a and 2b, and;

DESCRIPTION OF PREFERRED EMBODIMENTS

Figure 1:
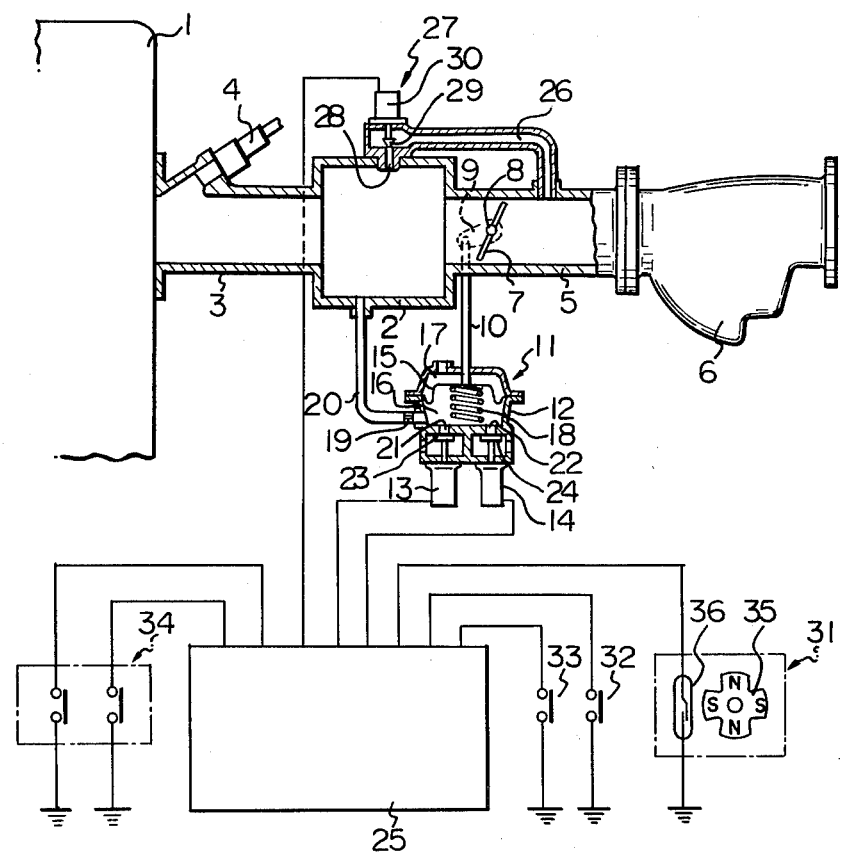
FIG. 1 is cross-sectional side view of the intake system of an engine.

Referring to FIG. 1, 1 designates an engine body, 2 a surge tank, 3 a plurality of branch pipes interconnecting the surge tank 2 to the corresponding cylinders of the engine, and 4 a fuel injector provided for each branch pipe 3; 5 designates an intake pipe, and 6 an air flow meter. The amount of fuel injected from the fuel injectors 4 is controlled on the basis of the output signal of the air flow meter 6, so that the air-fuel ratio of the fuel mixture fed into the cylinders of the engine becomes equal to a predetermined air-fuel ratio. A throttle valve 7 is arranged in the intake pipe 5, and a throttle shaft 8 of the throttle valve 7 is connected via the throttle lever link mechanism (not shown) to the accelerator pedal arranged in the drivers compartment. In addition, an arm 9 is fixed onto the throttle shaft 8, and the tip of the arm 9 is connected to a main actuator 11 via a control rod 10. Consequently, when the accelerator pedal is depressed and, thus, the throttle valve 7 is rotated in the opening direction, the arm 9 is rotated and, as a result, the control rod 10 is caused to move. The main actuator 11 comprises a vacuum operated diaphragm apparatus 12, an electromagnetic control valve apparatus 13 and an electromagnetic relief valve apparatus 14. The diaphragm apparatus 12 comprises a vacuum chamber 16 and an atmospheric pressure chamber 17 which are separated by a diaphragm 15, and the control rod 10 is secured onto the diaphragm 15. A compression spring 18 is arranged in the vacuum chamber 16 for biasing the diaphragm 15 towards the atmospheric pressure chamber 17, and the vacuum chamber 16 is connected to the interior of the surge tank 2 via a restricted opening 19 and a vacuum conduit 20. As illustrated in FIG. 1, a pair of valve ports 21, 22 is formed on the housing of the diaphragm apparatus 12, which defines the vacuum chamber 16. The opening operation of the valve port 21 is controlled by a control valve 23 of the electromagnetic control valve apparatus 13, and the opening operation of the valve port 22 is controlled by a control valve 24 of the electromagnetic relief valve apparatus 14. The electromagnetic control valve apparatus 13 and the electromagnetic relief valve apparatus 14 are connected to an electronic control unit 25. When the solenoid of the electromagnetic control valve apparatus 13 and the solenoid of the electromagnetic relief valve apparatus 14 are energized by the output signal of the electronic control unit 25, the control valves 23, 24 open the corresponding valve ports 21, 22. On the other hand, when the solenoid of the electromagnetic control valve apparatus 13 and the solenoid of the electromagnetic relief valve apparatus 14 are deenergized, the control valves 23, 24 close the corresponding valve ports 21, 22.

An auxiliary intake passage 26, having a cross-sectional area which is considerably smaller than that of the intake pipe 5, is branched off from the intake pipe 5 located upstream of the throttle valve 7, and the auxiliary intake passage 26 is connected to the surge tank 2 via an auxiliary actuator 27. The auxiliary actuator 27 comprises a control valve 29 for controlling the flow area of a valve port 28, and a linear solenoid 30 for actuating the control valve 29, and the linear solenoid 30 is connected to the electronic control unit 25. The control valve 29 is so actuated that the flow area of the valve port 28 is increased as the electric current, fed into the linear solenoid 30, is increased. In the embodiment illustrated in FIG. 1, instead of using the linear solenoid 30, a step motor may be used. When the engine is operating, a large part of air is fed into the surge tank 2 via the throttle valve 7, and the remaining small part of air is fed into the surge tank 2 via the auxiliary intake passage 26.

As illustrated in FIG. 1, a vehicle speed sensor 31 for detecting a vehicle speed, a set switch 32, a resume switch 33 and a cancel switch 34 are connected to the electronic control unit 25. The vehicle speed sensor 31 is arranged in the speed meter instrument (not shown) and comprises a rotary permanent magnet 35 rotated by the speed meter cable (not shown), and a reed switch 36 operated by the permanent magnet 35. The vehicle speed sensor 31 produces continuous pulses, the number of which is proportional to the vehicle speed, and the continuous pulses are fed into the electronic control unit 25. The set switch 32 is a switch which is turned to the ON position by the driver when the driver wishes to maintain the vehicle speed at which the vehicle is now driven. Consequently, after the set switch 32 is turned to the ON position by the driver, the vehicle is driven at a constant speed. The cancel switch 34 comprises a brake switch and a clutch switch and serves to interrupt the speed maintaining control when the brake pedal or the clutch pedal (not shown) is depressed. The resume switch 33 is a switch turned to the ON position by the driver after the speed maintaining control is interrupted by the cancel switch 34 when the driver wishes to resume and maintain again the vehicle speed which was previously set by the set switch 32.

Figure 2A:
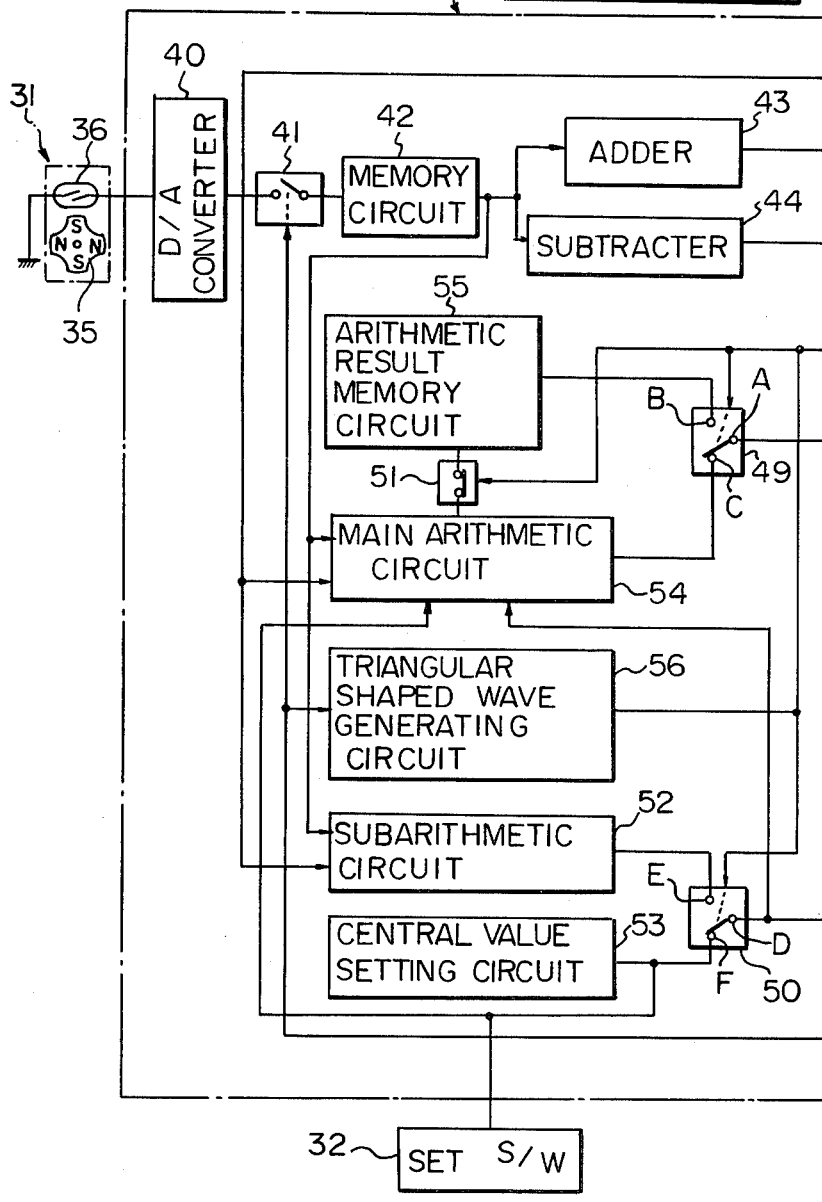
FIGS. 2a and 2b are circuit diagrams of an embodiment of an electronic control circuit according to the present invention.
Figure 2B:
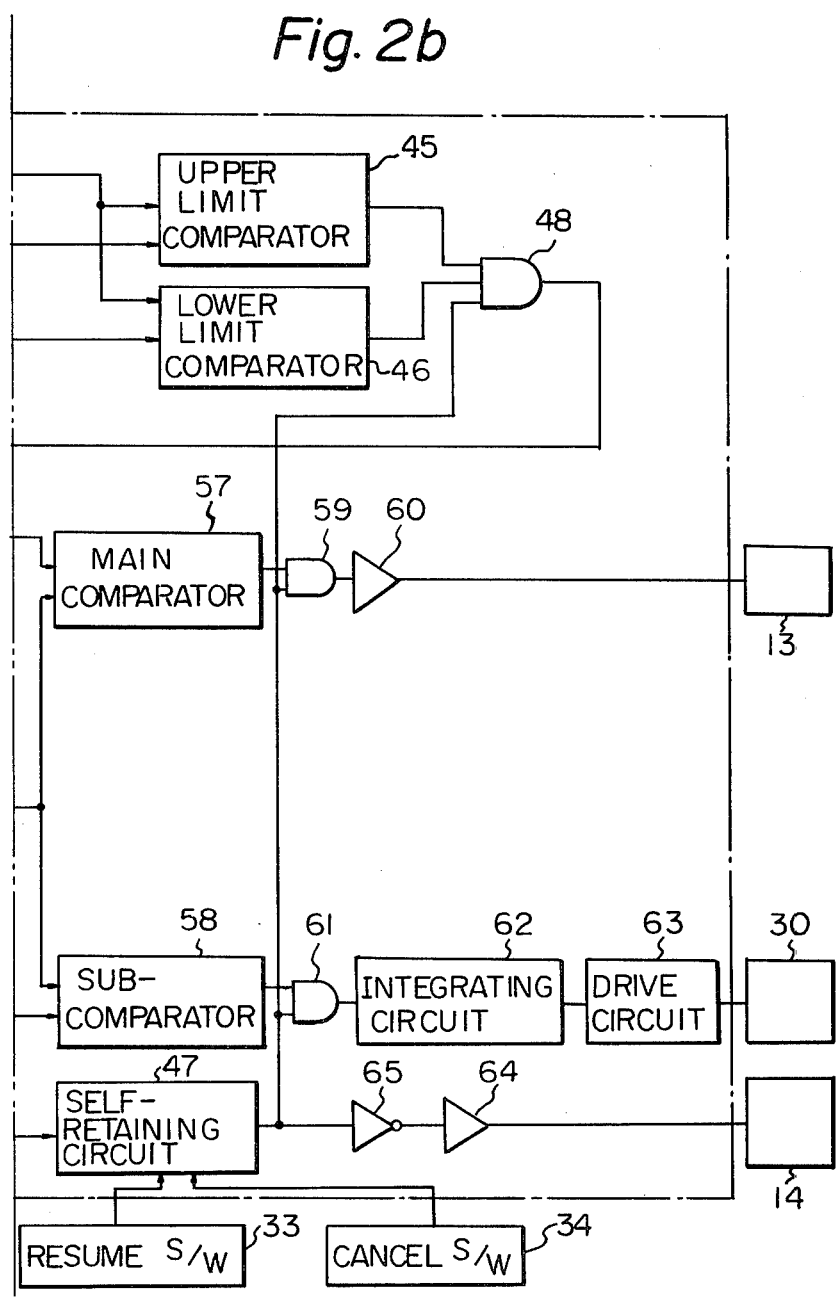

FIG. 2 illustrates a first embodiment of the electronic control unit 25 illustrated in FIG. 1. Referring to FIG. 2, the pulse signal, produced in the vehicle speed sensor 31, is converted, in the D/A converter 40, to an analog voltage signal having a potential level which is proportional to the vehicle speed. If the driver wishes to maintain a vehicle speed at which the vehicle is now driven and, thus, the set switch 32 is turned to the ON position, a first analog switch 41 is turned to the conductive state and, as a result, the potential level corresponding to a set speed, that is, corresponding to the vehicle speed at which the vehicle is now driven, is stored in an analog memory circuit 42. As described hereinafter in detail, in the present invention, the control of the vehicle speed is carried out by the auxiliary actuator 27 when the vehicle speed is in a predetermined vehicle speed range, the center of which is equal to the set speed. The upper limit and the lower limit of the above-mentioned vehicle speed range are calculated in an adder 43 and a subtracter 44, respectively, and the output voltages of the adder 43 and the subtracter 44, which represent the upper limit and the lower limit of the vehicle speed range, are input into one of input terminals of an upper limit comparator 45 and one of input terminals of a lower limit comparator 46, respectively. On the other hand, the output voltage of the D/A converter 40 is input into the other input terminals of the upper limit comparator 45 and the lower limit comparator 46. The output voltage of the adder 43 and the output voltage of the D/A converter 40 are compared in the upper limit comparator 45, and the upper limit comparator 45 produces the high level signal when the vehicle speed at which the vehicle is now driven is lower than the above-mentioned upper limit of the vehicle speed. In addition, the output voltage of the subtracter 44 and the output voltage of the D/A converter are compared in the lower limit comparator 46, and the lower limit comparator 46 produces the high level signal when the vehicle speed at which the vehicle is now driven is higher than the above-mentioned lower limit of the vehicle speed. Consequently, it will be understood that both the upper limit comparator 45 and the lower limit comparator 46 produce the high level signal when the vehicle speed at which the vehicle is now driven is within the above-mentioned vehicle speed range. The set switch 32, the resume switch 33 and the cancel switch 34 are connected to a self-retaining circuit 47, and this self-retaining circuit 47 is operated by those switches 32, 33, 34. The output voltage of the self-retaining circuit 47 is maintained high when the set switch 32 is turned to the ON position and, then, the output voltage of the self-retaining circuit 47 becomes low when the cancel switch 34 is turned to the ON position. In addition, the output voltage of the self-retaining circuit 47 becomes high when the resume switch 33 is turned to the ON position after the cancel switch 34 is turned to the ON position. Three input terminals of an AND gate are connected to the output terminals of the upper limit comparator 45, the lower limit comparator 46 and the self-retaining circuit 47. In addition, the output terminal of the AND gate 48 is connected to a second analog switch 49, a third analog switch 50 and a fourth analog switch 51. The AND gate 48 produces the high level signal when all of the upper limit comparator 45, the lower limit comparator 46 and the self-retaining circuit 47 produce the high level signal. When the AND gate 48 produces the high level signal, the terminals A and B are turned to the conductive state in the second analog switch 49; the terminals D and E are turned to the conductive state in the third analog switch 50, and; the fourth analog switch 51 is turned to the non-conductive state. Contrary to this, when the AND gate 48 produces the low level signal as illustrated in FIG. 2, the terminals A and C are turned to the conductive state in the second analog switch 49; the terminals D and F are turned to the conductive state in the third analog switch 50, and; the fourth analog switch 51 is turned to the conductive state.

The subarithmetic circuit 52 is an analog arithmetic circuit calculating the following valve $V_S$ from the following equations (a) and (b) on the basis of the output voltage of the D/A converter 40 and the memory circuit 42.

$$V_s = K_1 \cdot V_{SET} + K_2 \cdot \Delta V \quad (a)$$

$$\Delta V = V_{SET} - V \quad (b)$$

where
- $V_{SET}$: Output voltage of the memory circuit 42, which represents the set speed.
- $V$: Output voltage of the D/A converter 40, which represents the vehicle speed at which the vehicle is now driven.
- $V_s$: Output voltage of the subarithmetic circuit 52.
- $K_1, K_2$: Proportional constant.

The first term $K_1 \cdot V_{SET}$ of the right side of the above equation (a) represents the reference voltage which is approximately equal to the central value of the output control voltage of the subarithmetic circuit 52, and it is preferable that the reference voltage $K_1 \cdot V_{SET}$ be increased in accordance with an increase in the set speed. However, instead of increasing the reference voltage $K_1 \cdot V_{SET}$ as mentioned above, the reference voltage $K_1 \cdot V_{SET}$ may be equalized to a fixed voltage which is approximately equal to the central value of the output control voltage of the subarithmetic circuit 52. On the other hand, from the above equations (a) and (b), it will be understood that the output voltage $V_S$ of the subarithmetic circuit 52 is increased beyond the reference voltage $K_1 \cdot V_{SET}$ as the vehicle speed V is reduced relative to the set speed $V_{SET}$, and that the output voltage $V_S$ of the subarithmetic circuit 52 is reduced below the reference voltage $K_1 \cdot V_{SET}$ as the vehicle speed V is increased relative to the set speed $V_{SET}$. The output terminal of the subarithmetic circuit 52 is connected to the terminal E of the third analog switch 50, and the terminal F of the third analog switch 50 is connected to the output terminal of a central value setting circuit 53. The central value setting circuit 53 is a circuit for producing the central value of the output control voltage of the subarithmetic circuit 52.

The main arithmetic circuit 54 is an analog arithmetic circuit calculating the following value $V_M$ from the following equation (c) on the basis of the output voltage of the D/A converter 40, the memory circuit 42, the central value setting circuit 53 and the third analog switch 50.

$$V_M = K_3 \cdot V_{SET} + K_4 \cdot \Delta V + K_5 \cdot (V_S - V_{SC}) \quad (c)$$

where
- $V_M$: Output voltage of the main arithmetic circuit 54.
- $K_3, K_4, K_5$: Proportional constant.

The first term $K_3 \cdot V_{SET}$ of the right side of the above equation (c) is a reference voltage which is increased in accordance with an increase in the set speed $V_{SET}$, and the output control voltage of the main arithmetic circuit 54 is increased or reduced relative to the reference voltage $K_3 \cdot V_{SET}$. The second term $K_4 \cdot \Delta V$ of the right side of the above equation (c) becomes equal to a voltage which is proportional to the difference between the vehicle speed V and the set speed $V_{SET}$. Consequently, the output voltage $V_M$ of the main arithmetic circuit 54 is increased as the vehicle speed V is reduced below the set speed $V_{SET}$, and the output voltage $V_M$ of the main arithmetic circuit 54 is reduced as the vehicle speed V is increased beyond the set speed $V_{SET}$. In addition, the third term $K_5 \cdot (V_S - V_{SC})$ of the right side of the above equation (c) is a correction processing term which will be hereinafter described. The output terminal of the main arithmetic circuit 54 is connected to the terminal C of the second analog switch 49, and the terminal B of the second analog switch 49 is connected to the output terminal of the arithmetic result storing or memory circuit 55. The arithmetic result storing circuit 55 is provided for storing the output voltage $V_M$ of the main arithmetic circuit 54, which is produced immediately before the fourth analog switch 51 is turned to the non-conductive state.

The electronic control unit 25 further comprises a triangular shaped wave generating circuit 56, a main comparator 57 and a subcomparator 58. The triangular shaped wave generating circuit 56 produces a triangular shaped wave, for example, having a frequency of 20 Hz and having a peak to peak value of 0 V to 5 V. One of the input terminals of the main comparator 57 is connected to the terminal A of the second analog switch 49, and the other input terminal of the main comparator 57 is connected to the output terminal of the triangular shaped wave generating circuit 56. The main comparator 57 produces the high level signal when the voltage of the terminal A of the second analog switch 49 becomes larger than the output voltage of the triangular shaped wave generating circuit 56. The output terminal of the main comparator 57 is connected to one of the input terminals of the AND gate 59, and the other input terminal of the AND gate 59 is connected to the output terminal of the self-retaining circuit 47. In addition, the output terminal of the AND gate 59 is connected to the electromagnetic control valve apparatus 13 of the main actuator 11 (FIG. 1) via a power amplifier 60. On the other hand, one of the input terminals of the subcomparator 58 is connected to the terminal D of the third analog switch 50, and the other input terminal of the subcomparator 58 is connected to the output terminal of the triangular shaped wave generating circuit 56. The subcomparator 58 produces the high level signal when the voltage of the terminal D of the third analog switch 50 becomes larger than the output voltage of the triangular shaped wave generating circuit 56. The output terminal of the subcomparator 58 is connected to one of the input terminals of the AND gate 61, and the other input terminal of the AND gate 61 is connected to the output terminal of the self-retaining circuit 47. In addition, the output terminal of the AND gate 61 is connected to the linear solenoid 30 of the auxiliary actuator 27 (FIG. 1) via an integrating circuit 62 and a drive circuit 63. Continuous pulses, produced at the output terminal of the AND gate 61, are integrated in the integrating circuit 62 and, thus, the integrating circuit 62 produces an output voltage which is proportional to the width of the continuous pulses. Then, in the drive circuit 63, the output voltage of the integrating circuit 62 is converted to an electric current which is proportional to the output voltage of the integrating circuit 62.

The operation of a speed maintaining device according to the present invention will be hereinafter described with reference to FIGS. 1 through 3.

Figures 3E, 3F, 3G:
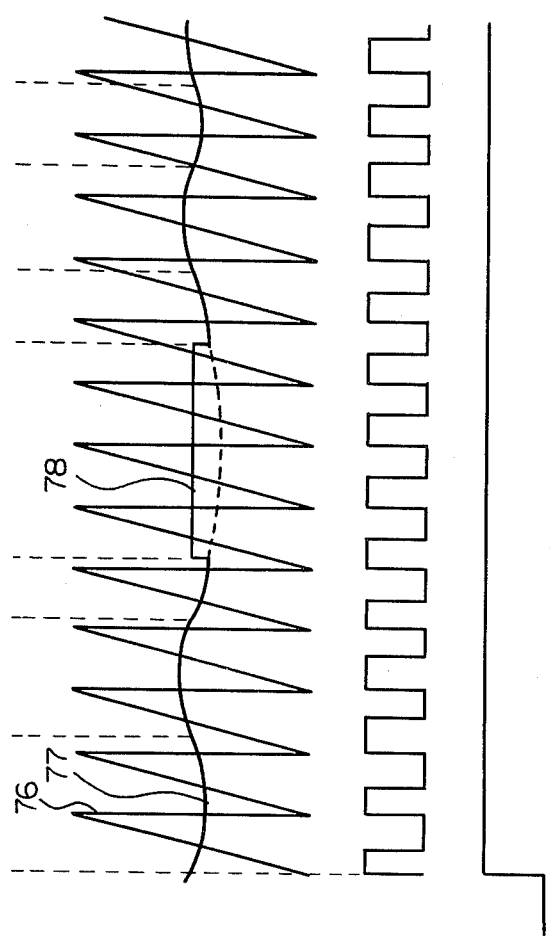

When the set switch 32 is turned to the ON position, a set signal 70, illustrated in FIG. 3 (d), is produced, and the first analog switch 41 is turned to the conductive state, as mentioned previously. Then, the first analog switch 41 is turned to the non-conductive state by the trailing edge of the set signal 70, and the output voltage of the D/A converter 40, which is produced immediately before the first analog switch 41 is turned to the non-conductive state, is stored in the memory circuit 42. The output voltage thus stored is used as a set speed signal. On the other hand, as illustrated in FIG. 3 (g), the self-retaining circuit 47 is triggered by the trailing edge of the set signal 70 and produces the high level output. In addition, an upper limit signal and a lower limit signal are produced in the adder 43 and the subtracter 44, respectively, on the basis of the set speed signal stored in the memory circuit 42. When the set speed is, for example, 60 Km/h, the upper limit signal represents 61 Km/h, and the lower limit signal represents 58 Km/h. In FIG. 3 (b), the straight line 71 indicates the set speed; the straight line 72 indicates the upper limit of the vehicle speed; the straight line 73 indicates the lower limit of the vehicle speed; and; the curved line 74 indicates the vehicle speed at which the vehicle is now driven. When the set signal 70 is changed from the high level to the low level, the self-retaining circuit 47 produces the high level signal as mentioned above. At this time, since the upper limit comparator 45 and the lower limit comparator 46 also produce the high level signal, the AND gate 48 produces the high level output. As a result of this, as mentioned previously, the terminals A and B are turned to the conductive state in the second analog switch 49; the terminals D and E are turned to the conductive state in the third analog switch 50, and; the fourth analog switch 51 is turned to the non-conductive state. When the fourth analog switch 51 is turned to the non-conductive state, the output voltage $V_M$ of the main arithmetic circuit 54, which is produced immediately before the fourth analog switch 51 is turned to the non-conductive state, is stored in the arithmetic result storing circuit 55. In FIG. 3 (c), the voltage, stored in the arithmetic result storing circuit 55, is indicated by the solid line 75, and the output voltage of the triangular shaped wave generating circuit 56 is indicated by the solid line 76. The stored voltage 75 and the output voltage 76 are compared in the main comparator 57, and the main comparator 57 produces the high level signal when the stored voltage 75 becomes higher than the output voltage 76. Consequently, as illustrated in FIG. 3 (d), the main comparator 57 produces continuous pulses. As will be understood from FIG. 3 (b), during the time period from $t_0$ to $t_1$, since the vehicle speed 74 at which the vehicle is now driven is within the range of speed between the upper limit 72 and the lower limit 73, the AND gate 48 continues to produce the high level signal and, thus, the terminals A and B of the second analog switch 49 are maintained in the conductive state. Consequently, during the time period from $t_0$ to $t_1$, the width of each of the continuous pulses issued from the main comparator 57 becomes the same as illustrated in FIG. 3 (d). The continuous pulses issued from the main comparator 57 are applied to the electromagnetic control valve apparatus 13 via the AND gate 59 and the power amplifier 60.

As mentioned previously, in FIG. 1, when the solenoid of the electromagnetic control valve apparatus 13 is energized, the control valve 23 opens the valve port 21. Consequently, during the time period from $t_0$ to $t_1$, the control valve 23 repeatedly opens the valve port 21 for a fixed time period at the same time intervals. Consequently, since air is bled into the vacuum chamber 16 from the valve port 21 at a constant flow rate, the level of the vacuum produced in the vacuum chamber 16 is maintained constant and, thus, the opening degree of the throttle valve 7 is maintained constant.

Turning to FIG. 2, during the time period from $t_0$ to $t_1$, since the AND gate 48 produces the high level signal, the terminals D and E of the third analog switch 50 are in the conductive state. As mentioned previously, in the subarithmetic circuit 52, $V_S$ is calculated from the above-mentioned equations, and the subarithmetic circuit 52 produces the output voltage $V_S$. This output voltage $V_S$ is indicated by reference numeral 77 in FIG. 3 (e). From FIG. 3, it will be understood that the output voltage 77 is reduced as the vehicle speed 74 is increased, and that the output voltage 77 is increased as the vehicle speed 74 is reduced. The output voltage 77 of the subarithmetic circuit 52 and the output voltage 76 of the triangular shaped wave generating circuit 56 are compared in the subcomparator 58, and the subcomparator 58 produces the high level signal when the output voltage 77 of the subarithmetic circuit 52 becomes larger than the output voltage 76 of the triangular shaped wave generating circuit 56. Consequently, the subcomparator 58 produces continuous pulses, each having a width which is inversely proportional to the vehicle speed 74, as illustrated in FIG. 3 (f). The continuous pulses, issued from the subcomparator 58, are input into the integrating circuit 62 via the AND gate 61 and converted to a control voltage, which is proportional to the width of the continuous pulses, in the integrating circuit 62. Then, the control voltage is converted to an electric current, which is proportional to the control voltage, in the drive circuit 63 and, then, the electric current is fed into the linear solenoid 30.

In FIG. 1, the control valve 29 of the auxiliary actuator 27 moves upward in proportion to the amount of electric current fed into the linear solenoid 30 and, therefore, the flow area of the valve port 28 is increased in proportion to the amount of electric current fed into the linear solenoid 30. As mentioned above, the width of the continuous pulses issued from the subcomparator 58, that is, the duty cycle of the continuous pulses, is increased as the vehicle speed is reduced. Therefore, the flow area of the valve port 28 of the auxiliary actuator 27 is increased as the vehicle speed is reduced. Consequently, when the vehicle speed is reduced below the set speed, the amount of air fed into the surge tank 2 from the auxiliary intake passage 26 is increased and, thus, it will be understood that, when the vehicle speed is reduced below the set speed, the engine speed is increased so that the vehicle speed approaches the set speed. In addition, when the vehicle speed is increased beyond the set speed, the amount of air fed into the surge tank 2 from the auxiliary intake passage 26 is reduced and, thus, the vehicle speed is reduced so that the vehicle speed approaches the set speed. Consequently, during the time period from $t_0$ to $t_1$ in FIG. 3, the vehicle speed is controlled by air fed from the auxiliary intake passage 26. As illustrated in FIG. 2, the electromagnetic relief valve apparatus 14 is connected to the output terminal of the self-retaining circuit 47 via a power amplifier 64 and an inverter 65. Consequently, when the self-retaining circuit 47 produces the high level signal, as in the time period from $t_0$ to $t_1$ in FIG. 3, the electromagnetic relief valve apparatus 14 is deenergized. Therefore, at this time, the valve port 22 is closed.

In FIG. 3 (d), when time reaches $t_1$, since the vehicle speed 74 becomes higher than the upper limit vehicle speed 72, the upper limit comparator 45 produces the low level signal and, thus, the AND gate 48 also produces the low level signal. As a result of this, as illustrated in FIG. 2, the terminals A and C of the second analog switch 49 are turned to the conductive state; the terminals D and F of the third analog switch 50 are turned to the conductive state, and; the fourth analog switch 51 is turned to the conductive state. At this time, as illustrated in FIG. 3 (d), the fixed output voltage of the central value setting circuit 53 is applied to one of the input terminals of the subcomparator 58 and, thus, the subcomparator 58 produces continuous pulses, each having the same width. Consequently, at this time, the flow area of the valve port 28 is maintained constant. In addition, when time reaches $t_1$, since the terminals A and C of the second analog switch 49 are turned to the conductive state as mentioned above, the output voltage $V_M$ of the main arithmetic circuit 54 is applied to one of the input terminals of the main comparator 57. As mentioned previously, in the main comparator 57, the following calculation is carried out.

$$V_M = K_3 \cdot V_{SET} + K_4 \cdot \Delta V + K_5 \cdot (V_S - V_{SC})$$

In the above equation, $V_S$ indicates the output voltage of the subarithmetic circuit 52, and $V_{SC}$ indicates the output voltage of the central value setting circuit 53, which corresponds to the central value of the control output voltage of the subarithmetic circuit 52. When time reaches $t_1$, as illustrated in FIG. 3 (e), the voltage, applied to one of the input terminals of the subcomparator 58, is instantaneously increased from the output voltage $V_S$ of the subarithmetic circuit 52, which is indicated by reference numeral 77, to the output voltage $V_{SC}$ of the central value setting circuit 53, which is indicated by reference numeral 78. As a result of this, since the flow area of the valve port 28 of the auxiliary actuator 27 is instantaneously increased, the amount of air fed into the surge tank 2 from the auxiliary intake passage 26 is also instantaneously increased. The third term $K_5 \cdot (V_S - V_{SC})$ of the right side of the above equation is a correction term for compensating the increase in air fed from the auxiliary intake passage 26. That is, at the time $t_1$, in the case wherein the output voltage $V_{SC}$ of the central value setting circuit 53 is higher than the output voltage $V_S$ of the subarithmetic circuit 52, the output voltage of the main arithmetic circuit 54, which is applied to one of the input terminals of the main comparator 57, is instantaneously reduced due to the presence of the correction term $K_5 \cdot (V_S - V_{SC})$ as illustrated by reference numeral 79 in FIG. 3 (c). As mentioned previously, the widths of the continuous pulses produced at the output terminal of the main comparator 57, that is, the duty cycle of the continuous pulses is increased as the vehicle speed is reduced and, therefore, the opening time duration of the valve port 21 of the electromagnetic control valve device 13 becomes long as the vehicle speed is reduced. If the opening time duration of the valve port 21 becomes long, since the amount of air bled into the vacuum chamber 16 is increased, the level of the vacuum produced in the vacuum chamber 16 becomes small. As a result of this, since the diaphragm 15 moves towards the atmospheric pressure chamber 17, the opening degree of the throttle valve 7 becomes large. Consequently, if the vehicle speed is reduced below the set speed, since the opening degree of the throttle valve 7 becomes great, the amount of air fed into the cylinders of the engine is increased and, as a result, the vehicle speed approaches the set speed. Contrary to this, if the vehicle speed is increased beyond the set speed, since the opening degree of the throttle valve 7 becomes small, the amount of air fed into the cylinders of the engine is reduced and, as a result, the vehicle speed approaches the set speed. As will be understood from FIG. 3, during the time period from $t_1$ to $t_2$ the vehicle speed is controlled by the main actuator 11. When time reaches $T_2$, and the vehicle speed 74 is reduced below the upper limit vehicle speed 72, as illustrated in FIG. 3 (b), the vehicle speed is controlled again by the auxiliary actuator 27.

When, for example, the brake pedal is depressed and, thus, the cancel switch 34 is turned to the ON position, since the self-retaining circuit 47 produces the low level signal, the AND gates 59 and 61 produce the low level output. As a result of this, since the electromagnetic control valve apparatus 13 and the linear solenoid 30 are deenergized, the control valves 23 and 29 close the valve ports 21 and 28, respectively. On the other hand, when the self-retaining circuit 47 produces the low level signal as mentioned above, the electromagnetic relief valve apparatus 14 is energized and, thus, the control valve 24 fully opens the valve port 22. As a result of this, the pressure in the vacuum chamber 16 becomes equal to the atmospheric pressure. After the cancel switch 34 is turned to the ON position, the throttle valve 7 is controlled by the accelerator pedal.

When the resume switch 33 is turned to the ON position after the cancel switch 34 is operated, the self-retaining circuit 47 produces the high level signal and, thus, the controlling operation for maintaining a constant vehicle speed is started again. At this time, the set speed, which is set before the cancel switch 34 is operated, is stored in the memory circuit 42 and, therefore, the vehicle speed is so controlled that it becomes equal to the set speed which is set before the cancel switch 34 is operated. In the case wherein the driver wishes to change the set speed, the set speed can be changed by operating the set switch 32.

In the embodiment illustrated in FIG. 1, the auxiliary actuator 27 comprises the linear solenoid 30. However, instead of using the linear solenoid 30, the auxiliary actuator 27 may comprise a vacuum operated diaphragm apparatus and an electromagnetic control valve device, such as the electromagnetic control valve apparatus 13 (FIG. 1), for controlling the amount of air fed into the vacuum chamber of the vacuum operated diaphragm apparatus as in the main actuator 11. In this case, the control valve 29 is connected to and controlled by the diaphragm of the vacuum operated diaphragm apparatus.

Figure 4B:
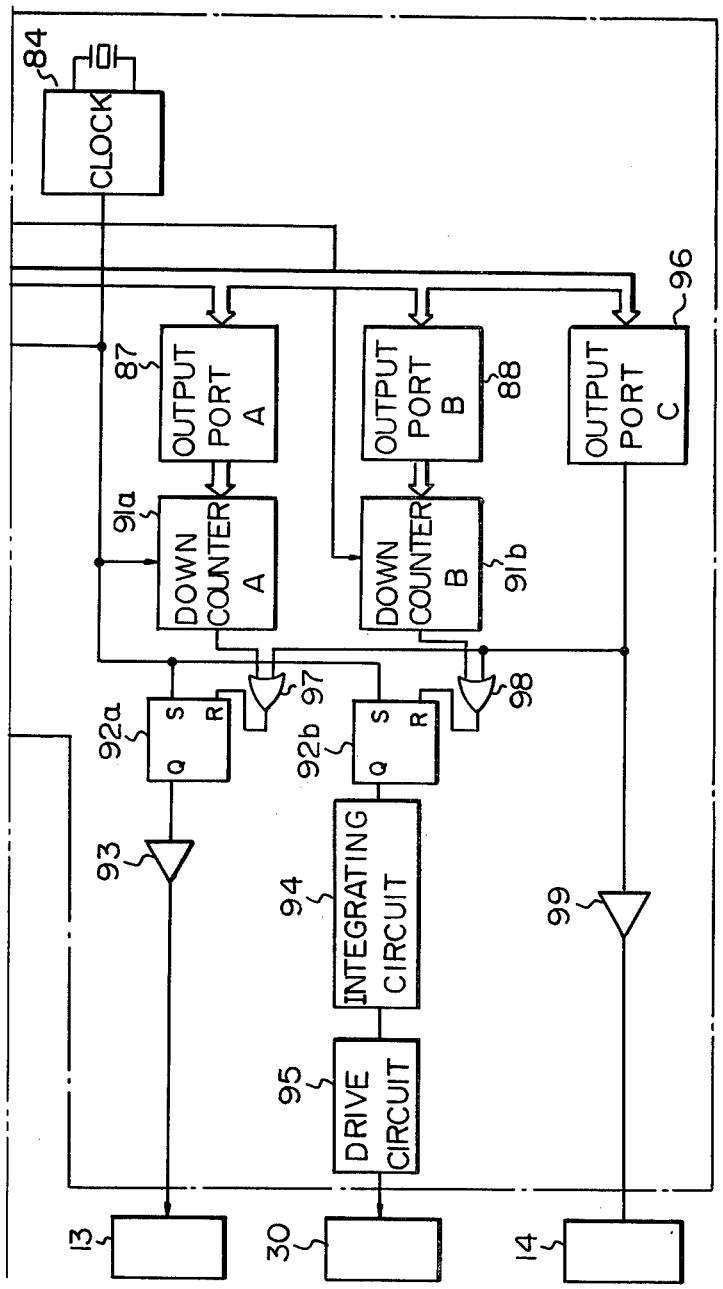

FIG. 4 illustrates an alternative embodiment in which a microcomputer is used. Referring to FIG. 4, the electronic control unit 80 is constructed as a digital computer and comprises a microprocessor (MPU) 81 carrying out the arithmetic and logic processing, a random-access memory (RAM) 82, a read-only memory (ROM) 83 storing a predetermined control program and arithmetic constant therein, a clock generator 84 generating various clock signals, an input port A 85, an input port B 86, an output port A 87 and an output port B 88 and an output port C 96. The MPU 81, the RAM 82, the ROM 83, the input port A 85, the input port B 86, the output port A 87, the output port B 88 and the output port C 96 are interconnected to each other via a bidirectional bus 89. In the electronic control unit 80, the calculation of the following equations (a), (b) and (c) mentioned above is carried out.

$$V_S = K_1 \cdot V_{SET} + K_2 \cdot \Delta V \quad \text{(a)}$$

$$\Delta V = V_{SET} - V \quad \text{(b)}$$

$$V_M = K_3 \cdot V_{SET} + K_4 \cdot \Delta V + K_5 \cdot (V_S - V_{SC}) \quad \text{(c)}$$

The above equations (a), (b), (c) and the constants $K_1$, $K_2$, $K_3$, $K_4$, $K_5$ are stored in the ROM 83.

As illustrated in FIG. 4, the vehicle speed sensor 31 is connected to the input port A 85 via the gate & counter 90. In the gate & counter 90, the output signal of the vehicle speed sensor 31 is counted for a fixed time period by the clock signal of the clock generator 84, and the binary count value, which is proportional to the vehicle speed, is input into the MPU 81 from the gate & counter 90 via the input port A 85 and the bus 89. In addition, the set switch 32, the resume switch 33, the cancel switch 34 and a main switch 79 are connected to the input port B 86, and the signals, issued from the switches 32, 33, 34, 79, are input into the MPU 81 via the input port B 86 and the bus 89. The output port A 87 and the output port B 88 are provided for outputting data necessary to actuate the main actuator 11 (FIG. 1) and the auxiliary actuator 27, respectively, and binary coded data is written in the output port A 87 and the output port B 88 from the MPU 81 via the bus 89. The output terminals of the output port A 87 are connected to the corresponding input terminals of a down counter A 91a, and the output terminals of the output port B 88 are connected to the corresponding input terminals of a down counter B 91b. The down counter A 91a and the down counter B 91b are provided for converting the binary coded data, written in the output port A 87 and the output port B 88, to the corresponding length of time, respectively. That is, the down count of the binary coded data fed into the down counter A 91a and down counter B 91b from the output port A 87 and the output port B 88 respectively, is started by the clock signal of the clock generator 84. After this, when the content of the down counter A 91a and the down counter B 91b becomes equal to zero, the down count of the binary coded data is completed, and the down count completion signal is produced at the output terminals of the down counter A 91a and the down counter B 91b. The reset input terminals R of S-R flip-flops 92a and 92b are connected to the output terminals of OR gates 97 and 98, respectively. One of the input terminals of the OR gate 97 is connected to the output terminal of the down counter A 91a, and the other input terminal of the OR gate 97 is connected to the output port C 96. In addition, one of the input terminals of the OR gate 98 is connected to the output terminal of the down counter B 91b, and the other input terminal of the OR gate 98 is connected to the output port C 96. Furthermore, the set input terminals S of the S-R flip-flops 92a, 92b are connected to the clock generator 84. The S-R flip-flops 92a, 92b are triggered and set by the clock signal of the clock generator 84 at the same time the down count of the down counter A 91a and the down counter B 91b is started, and the S-R flip-flops 92a, 92b are reset by the down count completion signal of the down counter A 91a and the down counter B 91b at the same time of the completion of the down counter A 91a and the down counter B 91b. Consequently, the output voltage, produced at the output terminals Q of the S-R flip-flops 92a, 92b, becomes high during the time the down count of the down counter A 91a and the down counter B 91b is carried out. The output terminal Q of the S-R flip-flop 92a is connected to the electromagnetic control valve apparatus 13 of the main actuator 11 via a power amplifier 93, and the electromagnetic control valve apparatus 13 is energized when the S-R flip-flop 92a produces the high level signal. Consequently, it will be understood that the electromagnetic control valve apparatus 13 is actuated during the time the down count of the down counter A 91a is carried out. In addition, the output terminal Q of the S-R flip-flop 92b is connected to the linear solenoid 30 of the auxiliary actuator 27 via the integrating circuit 94 and the drive circuit 95. Consequently, electric current is fed into the linear solenoid 30 in an amount which is proportional to the duty cycle of the continuous pulses issued from the S-R flip-flop 92b. The electromagnetic relief valve apparatus 14 is connected to the output port C 96 via a power amplifier 99. As illustrated by the arrow in FIG. 4, the clock signals, having various frequencies, are fed into the MPU 81, the gate & counter 90, the down counter A 91a, the down counter B 91b and the S-R flip-flops 92a, 92b.

Figure 5B:
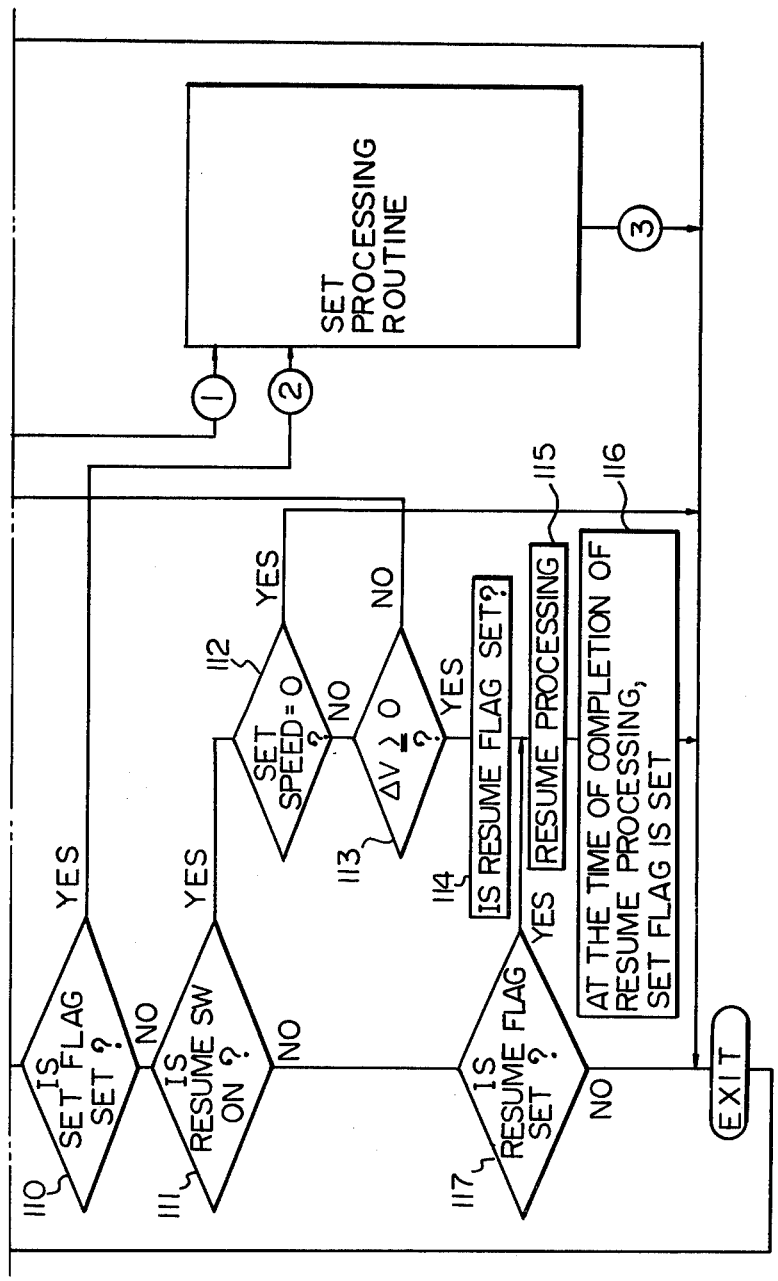
Figure 6:
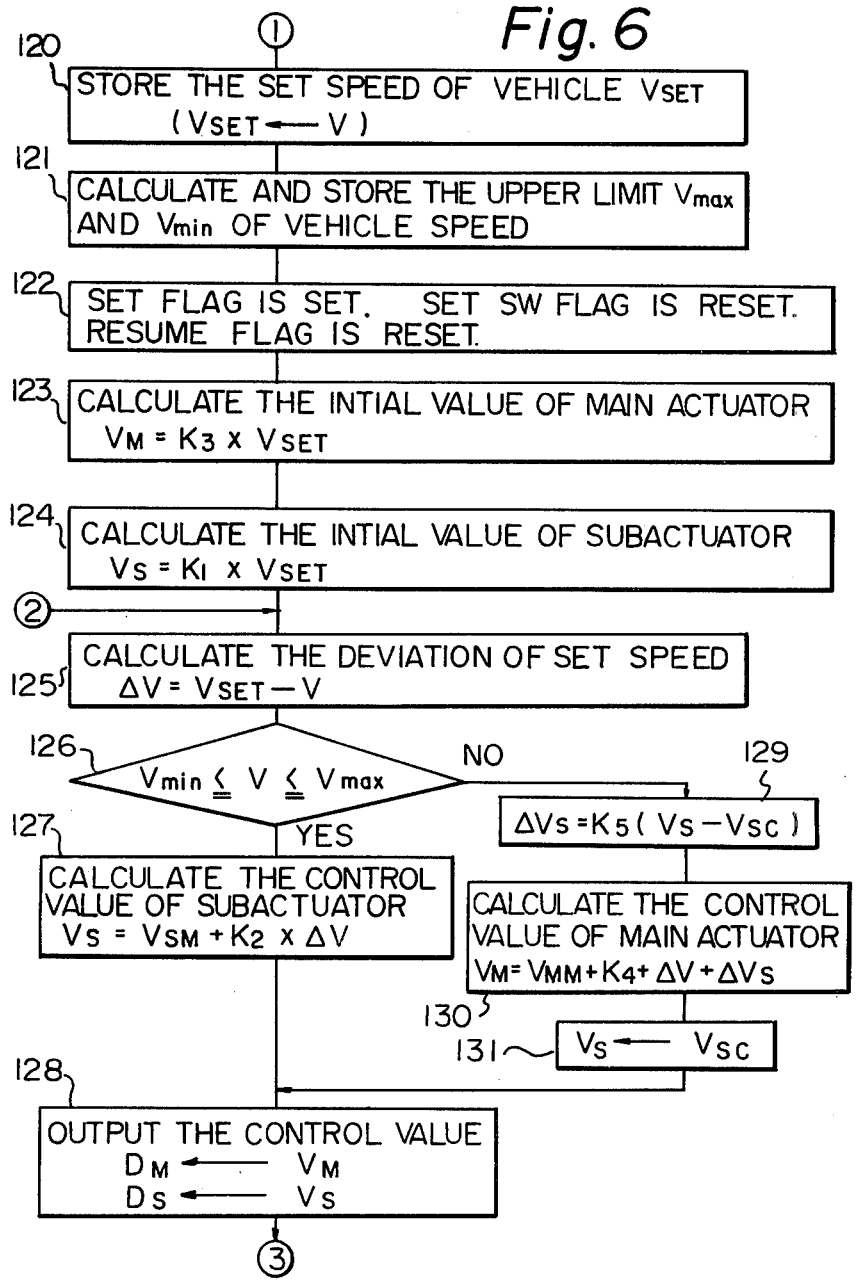
FIG. 6 is a flow chart for illustration of the operation of the electronic control circuit in FIGS. 2a and 2b.

The operation of the electronic control unit 80 will be hereinafter described with reference to FIGS. 5 and 6. FIG. 5 illustrates a flow chart illustrating the entire flow of the operation in which the routine of the electronic control unit 80 is processed by sequential interruptions which are executed periodically at predetermined times, for example, every 100 m sec. In addition, FIG. 6 illustrates a flow chart of a set processing routine in which the speed control of the vehicle is carried out. Consequently, the initial processing, which is carried out when power is initially applied to the electronic control unit 80, is excuted in accordance with another program which is not described here. Referring to FIG. 5, firstly, in step 100, it is determined whether the main switch 79, for example, the ignition switch, is in the ON position. When the main switch 79 is in the ON position, in step 101, the vehicle speed V, retained in the intake port A 85, is input into the register of the MPU 81. Then, in step 101, the upper limit of the vehicle speed, for example, 136 Km/h, and the lower limit of the vehicle speed, for example, 48 Km/h, are read out from the ROM 83 into the MPU 81, and it is determined whether the vehicle speed V is in a range between the above-mentioned lower limit and upper limit. When the main switch 79 is not in the ON position and when the vehicle speed V is not in a range between the above-mentioned lower limit and upper limit, zero is stored in a predetermined address of the RAM 82, which is provided for storing the set speed in step 102 and, then, the cancel processing is executed in step 103. When the vehicle speed V is in a range between the above-mentioned upper limit and lower limit, it is determined in step 104 whether the cancel switch 34 is in the ON position. When the cancel switch 34 is in the ON position, the cancel processing is executed in step 103. The cancel processing is a processing in which the valve ports 21 and 28 are closed by deenergizing the electromagnetic control valve apparatus 13 of the main actuator 11 and the linear solenoid 30 of the auxiliary actuator 27, and in which the valve port 22 is fully opened by energizing the electromagnetic relief valve apparatus 14. Then, after completion of the cancel processing, in step 105, a set flag, indicating that the speed maintaining processing has been executed, is reset, and a resume flag, indicating that the hereinafter described resume processing has been executed, is reset. Then, the processing cycle is completed. When it is determined that the cancel switch 34 is not in the ON position in step 104, it is determined in step 106 whether the set switch 32 is now in the ON position. When the set switch 32 is now in the ON position, the retard processing is executed in step 107. The retard processing is a processing for starting the speed maintaining control after reducing the vehicle speed to a desirable set speed which a driver wishes to maintain when the vehicle speed is rather higher than the above-mentioned desired set speed. In this retard processing, when the set switch 32 remains pushed by a driver, the electromagnetic control valve apparatus 13 of the main actuator 11 and the linear solenoid 30 of the auxiliary actuator 27 is deenergized. When the retard processing is completed, the set SW flag is set in step 108, and the processing cycle is completed. When it is determined that the set switch 32 is not now in the ON position in step 106, it is determined in step 109 whether the set switch 32 was in the ON position in the preceding processing cycle on the basis of whether the set SW flag is set in step 108. When the set SW flag is set, the speed maintaining processing is executed in the set processing routine. On the other hand, when it is determined that the set switch 32 was not in the ON position in the preceding cycle in step 109, it is determined in step 110 whether the set flag is set. When the set flag is set, the speed maintaining processing continues to be executed in the set processing routine. Contrary to this, when it is determined that the set flag is not set in step 110, it is determined in step 111 whether the resume switch 33 is now in the ON position. When the resume switch 33 is now in the ON position, it is determined in step 112 whether the set speed is equal to zero. When the set speed is equal to zero, the processing cycle is completed. Contrary to this, when it is determined that the set speed is not equal to zero in step 112, it is determined in step 113 whether $\Delta V$ of the above-mentioned equation (b) is positive. When $\Delta V$ is not positive, that is, when the vehicle speed V is higher than the set speed $V_{SET}$, the above-mentioned retard processing is executed during the time the resume switch 33 remains pushed. Contrary to this, when it is determined that $\Delta V$ is positive in step 113, that is, when the vehicle speed V is higher than the set speed $V_{SET}$, the resume flag 114 is set in step 114 and, then, the resume processing is executed in step 115. This resume processing is a processing for gradually increasing the vehicle speed to the set speed. When the resume processing is completed, that is, when the vehicle speed becomes equal to the set speed, in step 116, the set flag is set and, then, the processing, which is necessary to execute the speed maintaining processing after completion of the present processing cycle, is executed. If it is determined that the resume switch 33 is not now in the ON position in step 111, it is determined in step 117 whether the resume flag is set. When the resume flag is set, the resume processing is executed in step 115. Contrary to this, when it is determined that the resume flag is not set, the processing cycle is completed. The resume processing is continuously executed by the processing in steps 111 through 117, and when the resume processing is completed, the set processing routine is executed on the basis of the determination in step 110.

Referring to FIG. 6, illustrating the set processing routine in FIG. 5, if it is determined in step 109 (FIG. 5) that the set switch 32 was set in the preceding processing cycle, that is, if it is determined in step 109 that the set SW flag is set, the store processing of the set speed $V_{SET}$ is executed in step 120. That is, in step 120, the vehicle speed V, retained in the input port A 85, is input into the MPU 81 and, then, this vehicle speed V is stored in a predetermined address of the RAM 82 as a set speed $V_{SET}$. After this, in step 121, the upper limit $V_{max}$ of the vehicle speed, which corresponds to the straight line 72 in FIG. 3 (b), and the lower limit $V_{min}$ of the vehicle speed, which corresponds to the straight line 73 in FIG. 3 (b), are calculated and stored in a predetermined address in the RAM 82. When the upper limit $V_{max}$ and the lower limit $V_{min}$ are calculated, $\Delta V_{max}$ (=the upper limit $V_{max}$—the set speed $V_{SET}$) and $\Delta V_{min}$ (=the set speed $V_{SET}$—the lower limit $V_{mix}$) may be constant independently of the set speed $V_{SET}$, or may be a linear function of the set speed $V_{SET}$.

Then, in step 122, the set flag is set, and the set SW flag and the resume flag are reset. After this, in step 123, the initial value $V_M = K_3 \cdot V_{SET}$ of the main actuator is calculated and stored in a predetermined address in the RAM 82. Then, in step 124, the initial value $V_S = K_1 \cdot V_{SET}$ of the auxiliary actuator is calculated and stored in a predetermined address in the RAM 82. Since the processings in steps 120 through 124 are executed only when the set switch 32 is in the ON condition in the preceding processing cycle, the processings in steps 120 through 124 are initially executed only one time when the set processing routine is executed. Then, in step 125, the vehicle speed V, at which the vehicle is now driven, is input into the MPU 81 from the input port A 85, and the $V_{SET}$ is read out from the RAM 82. In addition, in step 125, the difference $\Delta V(=V_{SET}-V)$ between the set speed $V_{SET}$ and the vehicle speed V is calculated and stored in a predetermined address in the RAM 82. Then, in step 126, the lower limit $V_{min}$ and the upper limit $V_{max}$ are read out from the RAM 82, and it is determined whether the vehicle speed V is within the range between the lower limit $V_{min}$ and the upper limit $V_{max}$. If it is determined in step 125 that the vehicle speed V is within the range between the lower limit $V_{min}$ and the upper limit $V_{max}$, in step 127, the initial value $V_S$ and the speed difference $\Delta V$ are read out from the RAM 82, and the calculation of $V_S+K_2 \cdot \Delta V$ is executed in the ROM 83 for obtaining the control value for the subactuator. The result of the calculation is stored in the RAM 82 as a control value $V_S$. Then, in step 128, the control value $V_S$ is written in the output port B 88. At this time, since the control value of the main actuator is equal to the initial value $v_S$, this initial value $V_S$ is written in the output port A 87. Then, the processing cycle is completed. In the next processing cycle, since the set flag has been set, the processing step goes to step 125 from step 110 (FIG. 5), and the calculation of $V_S+K_2 \cdot \Delta V$ is executed again for obtaining the control value for the auxiliary actuator.

On the other hand, if it is determined in step 126 that the vehicle speed V is not within the range between the lower limit $V_{min}$ and the upper limit $V_{max}$, the calculation of the correction value $\Delta V_S = K_5 \cdot (V_S - V_{SC})$ is executed in step 129. This correction value $\Delta V_S$ corresponds to the throttle valve opening degree correction illustrated by reference numeral 79 in FIG. 3 (c). Then, in step 130, the calculation of $V_M + K_4 \cdot \Delta V + \Delta V_S$ is executed for obtaining the control value for the main actuator, and the result of the calculation is stored in the RAM 82 as a control value $V_M$. Then, in step 131, the central value $V_{SC}$ of the control range of the auxiliary actuator is stored in the RAM 82 as a control value $V_S$ of the auxiliary actuator. After this, in step 128, the control value $V_M$ of the main actuator is written in the output port A 87, and the control value $V_S$ of the auxiliary actuator is written in the output port B 88. Then, the processing cycle is completed. In the next processing cycle, since the control value $V_S$ of the auxiliary actuator is equal to the central value $V_{SC}$ of the control range of the auxiliary actuator, the correction value $\Delta V_S$ is equal to zero in step 129.

If it is determined again in step 126 that the vehicle speed V is within the range between the upper limit $V_{max}$ and the lower limit $V_{min}$, the calculation of $V_S + K_2 \cdot \Delta V$ is executed again for obtaining the control value for the auxiliary actuator. At this time, the control value $V_M$ for the main actuator is maintained constant.

According to the present invention, in the case wherein the speed maintaining control is carried out, when the vehicle speed is within a predetermined range of speed, the precise control of an amount of air fed into the cylinder of an engine is carried out by the auxiliary actuator. Consequently, it is possible to obtain a stable speed maintaining control of the vehicle speed.

While the invention has been described by reference to specific embodiments chosen for purposes of illustration, it should be apparent that numerous modifications could be made thereto by those skilled in the art without departing from the basic concept and scope of the invention.

I claim:

1. A speed maintaining device of a vehicle, comprising:
   a main intake passage having therein a throttle valve for controlling the amount of air fed into an engine;
   a main actuator connected to said throttle valve for controlling the opening degree of said throttle valve;
   an auxiliary intake passage branched off from said main intake passage upstream of said throttle valve and connected to said main intake passage downstream of said throttle valve, said auxiliary intake passage having therein an auxiliary valve for controlling the amount of air flowing within said auxiliary intake passage;
   an auxiliary actuator connected to said auxiliary valve for controlling the flow area of said auxiliary valve;
   vehicle speed detecting means for detecting a vehicle speed at which the vehicle is now driven;
   memory means for storing said vehicle speed as a set speed to be maintained on the basis of a driver's indication;
   discriminating means for comparing the vehicle speed and the set speed to produce discriminating signals representing whether the vehicle speed is within a range between a predetermined upper limit and a predetermined lower limit which are higher and lower than said set speed, respectively;
   main arithmetic control means in response to said discriminating signals for actuating said main actuator to minimize a speed difference between the vehicle speed and the set speed when the vehicle speed is not within said range, and;
   subarithmetic control means in response to said discriminating signals for actuating said auxiliary actuator to minimize said speed difference when the vehicle speed is within said range,
   wherein said device comprises a manually operated set switch, and said memory means stores the vehicle speed when said set switch is operated, and
   wherein said main actuator comprises a vacuum operated diaphragm apparatus connected to said throttle valve and having therein a vacuum chamber connected to a vacuum source, and an electromagnetic control valve controlling the level of the vacuum produced in said vacuum chamber in response to a control signal issued from said main arithmetic control means.

2. A speed maintaining device according to claim 1, wherein said electromagnetic control valve is arranged between said vacuum chamber and the atmosphere for controlling the amount of air bled into said vacuum chamber from the atmosphere.

3. A speed maintaining device according to claim 1, wherein said main actuator comprises a normally closed electromagnetic relief valve for causing said vacuum chamber to open to the atmosphere when the speed maintaining control is not carried out.

4. A speed maintaining device according to claim 3, wherein said device comprises a cancel switch, and said vacuum chamber opens to the atmosphere when said cancel switch is operated.

5. A speed maintaining device according to claim 4, wherein the electromagnetic control valve of said main actuator and the auxiliary valve of said auxiliary actuator closes when said cancel switch is operated.

6. A speed maintaining device according to claim 4, wherein said cancel switch is operated when a brake pedal or a clutch pedal of the vehicle is depressed.

7. A speed maintaining device according to claim 4, wherein said device comprises a resume switch which is manually operated for maintaining the vehicle speed at the set speed stored in said memory means after said cancel switch is operated.

8. A speed maintaining device of a vehicle, comprising:
- a main intake passage having therein a throttle valve for controlling the amount of air fed into an engine;
- a main actuator connected to said throttle valve for controlling the opening degree of said throttle valve;
- an auxiliary intake passage branched off from said main intake passage upstream of said throttle valve and connected to said main intake passage downstream of said throttle valve, said auxiliary intake passage having therein an auxiliary valve for controlling the amount of air flowing within said auxiliary intake passage;
- an auxiliary actuator connected to said auxiliary valve for controlling the flow area of said auxiliary valve;
- vehicle speed detecting means for detecting a vehicle speed at which the vehicle is now driven;
- memory means for storing said vehicle speed as a set speed to be maintained on the basis of a driver's indication;
- discriminating means for comparing the vehicle speed and the set speed to produce discriminating signals representing whether the vehicle speed is within a range between a predetermined upper limit and a predetermined lower limit which are higher and lower than said set speed, respectively;
- main arithmetic control means in response to said discriminating signals for actuating said main actuator to minimize a speed difference between the vehicle speed and the set speed when the vehicle speed is not within said range, and;
- subarithmetic control means in response to said discriminating signals for actuating said auxiliary actuator to minimize said speed difference when the vehicle speed is within said range;
- wherein said device comprises a manually operated set switch, and said memory means stores the vehicle speed when said set switch is operated, and
- wherein said auxiliary actuator comprises and electromagnetic control valve connected to said auxiliary valve and controlling the flow area of said auxiliary valve in response to a control signal issued from said subarithmetic control means.

9. A speed maintaining device of a vehicle, comprising:
- a main intake passage having therein a throttle valve for controlling the amount of air fed into an engine;
- a main actuator connected to said throttle valve for controlling the opening degree of said throttle valve;
- an auxiliary intake passage branched off from said main intake passage upstream of said throttle valve and connected to said main intake passage downstream of said throttle valve, said auxiliary intake passage having therein and auxiliary valve for controlling the amount of air flowing within said auxiliary intake passage;
- an auxiliary actuator connected to said auxiliary valve for controlling the flow area of said auxiliary valve;
- vehicle speed detecting means for detecting a vehicle speed at which the vehicle is now driven;
- memory means for storing said vehicle speed as a set speed to be maintained on the basis of a driver's indication;
- discriminating means for comparing the vehicle speed and the set speed to produce discriminating signals representing whether the vehicle speed is within a range between a predetermined upper limit and a predetermined lower limit which are higher and lower than said set speed, respectively;
- main arithmetic control means in response to said discriminating signals for actuating said main actuator to minimize a speed difference between the vehicle speed and the set speed when the vehicle speed is not within said range, and;
- subarithmetic control means in response to said discriminating signals for actuating said auxiliary actuator to minimize said speed difference when the vehicle speed is within said range,
- wherein said device comprises a manually operated set switch, and said memory means stores the vehicle speed when said set switch is operated, and
- wherein said discriminating means comprises and adder for calculating said upper limit, and a subtracter for calculating said lower limit.

10. A speed maintaining device of a vehicle, comprising:
- a main intake passage having therein a throttle valve for controlling the amount of air fed into an engine;
- a main actuator connected to said throttle valve for controlling the opening degree of said throttle valve;
- an auxiliary intake passage branched off from said main intake passage upstream of said throttle valve and connected to said main intake passage downstream of said throttle valve, said auxiliary intake passage having therein an auxiliary valve for controlling the amount of air flowing within said auxiliary intake passage;
- an auxiliary actuator connected to said auxiliary valve for controlling the flow area of said auxiliary valve;
- vehicle speed detecting means for detecting a vehicle speed at which the vehicle is now driven;
- memory means for storing said vehicle speed as a set speed to be maintained on the basis of a driver's indication;
- discriminating means for comparing the vehicle speed and the set speed to produce discriminating signals representing whether the vehicle speed is within a range between a predetermined upper limit and a predetermined lower limit which are higher and lower than said set speed, respectively;
- main arithmetic control means in response to said discriminating signals for actuating said main actuator to minimize a speed difference between the vehicle speed and the set speed when the vehicle speed is not within said range, and;
- subarithmetic control means in response to said discriminating signals for actuating said auxiliary actuator to minimize said speed difference when the vehicle speed is within said range, wherein said device comprises a manually operated set switch, and said memory means stores the vehicle speed when said set switch is operated, and wherein the main arithmetic control means comprises main arithmetic means calculating said speed difference and producing a main control output voltage changed in accordance with a change in said speed difference, and main pulse generating means producing continuous pulses which are applied to said main actuator and have a width controlled by said main control output voltage, said subarithmetic control means comprising subarithmetic means which calculates said speed difference and produces a subcontrol output voltage changed in accordance with a change in said speed difference, and subpulse generating means which produces continuous pulses applied to said auxiliary actuator and having a width which is controlled by said subcontrol output voltage.

11. A speed maintaining device according to claim 10, wherein said main arithmetic control means comprises arithmetic result storing means storing said main control output voltage for applying said stored main control output voltage to said main pulse generating means when the vehicle speed is within said range, said subarithmetic control means comprising a central value setting means which produces an output voltage for applying the output voltage of said central value setting means to said subpulse generating means when the vehicle speed is not within said range, the output voltage of said central value setting means being approximately equal to a central value of said subcontrol output voltage.

12. A speed maintaining device according to claim 11, wherein said main arithmetic control means comprises an analog switch for selectively connecting said arithmetic means or said arithmetic result storing means to said main pulse generating means in response to said discriminating signals.

13. A speed maintaining device according to claim 11, wherein said subarithmetic control means comprises an analog switch for selectively connecting said subarithmetic means or said central value setting means to said subpulse generating means in response to said discriminating signals.

14. A speed maintaining device according to claim 11, wherein said main arithmetic means calculates a voltage difference between said subcontrol output voltage and the output voltage of said central value setting means and produces said main control output voltage which is corrected by said voltage difference for correcting the opening degree of said throttle valve when the vehicle speed is increased beyond said upper limit or reduced below said lower limit.

15. A speed maintaining device according to claim 11, wherein said main arithmetic means produces an output voltage of $$K_3 \cdot V_{SET} + K_4 \cdot \Delta V + K_5 \cdot (V_S - V_{SC}),$$

wherein:
$V_{SET}$: said set speed
$\Delta V$: said speed difference
$V_S$: said subcontrol output voltage
$V_{SC}$: the output voltage of said central value setting means
$K_3, K_4, K_5$: proportional constant.

16. A speed maintaining device according to claim 10, wherein said subarithmetic means produces an output voltage of $$K_1 \cdot V_{SET} + K_2 \cdot \Delta V,$$

wherein
$V_{SET}$: said set speed
$\Delta V$: said speed difference
$K_1, K_2$: proportional constant.

17. A speed maintaining device according to claim 10, wherein said subarithmetic control means comprises a converter inserted between said subpulse generating means and said auxiliary actuator for converting the continuous pulses to a current which is proportional to the widths of said continuous pulses.

18. A speed maintaining device according to claim 10, wherein said main pulse generating means comprises a triangular shaped wave generator generating a triangular shaped output voltage, and a main comparator comparing said main control output voltage and said triangular shaped output voltage and producing said continuous pulses which are applied to said main actuator.

19. A speed maintaining device according to claim 10, wherein said subpulse generating means comprises a triangular shaped wave generator generating a triangular shaped output voltage, and a subcomparator comparing said subcontrol output voltage and said triangular shaped output voltage and producing said continuous pulses which are applied to said auxiliary actuator.

20. A speed maintaining device of a vehicle, comprising:
a main intake passage having therein a throttle valve for controlling the amount of air fed into an engine;
a main actuator connected to said throttle valve for controlling the opening degree of said throttle valve;
an auxiliary intake passage branched off from said main intake passage upstream of said throttle valve and connected to said main intake passage downstream of said throttle valve, said auxiliary intake passage having therein an auxiliary valve for controlling the amount of air flowing within said auxiliary intake passage;
an auxiliary actuator connected to said auxiliary valve for controlling the flow area of said auxiliary valve;
vehicle speed detecting means for detecting a vehicle speed at which the vehicle is now driven;
memory means for storing said vehicle speed as a set speed to be maintained on the basis of a driver's indication;
discriminating means for comparing the vehicle speed and the set speed to produce discriminating signals representing whether the vehicle speed is within a range between a predetermined upper limit and a predetermined lower limit which are higher and lower than said set speed, respectively;
main arithmetic control means in response to said discriminating signals for actuating said main acutator to minimize a speed difference between the vehicle speed and the set speed when the vehicle speed is not within said range, and;
subarithmetic control means in response to said discriminating signals for actuating said auxiliary acutator to minimize said speed difference when the vehicle speed is within said range, wherein said device comprises a manually operated set switch, and said memory means stores the vehicle speed when said set switch is operated, and wherein said main pouse generating means comprises a main arithmetic means calculating said speed difference and producing a main control binary coded data changed in accordance with a change in said speed difference, and main pulse generating means producing continuous pulses which are applied to said main actuator and have a widthe corresponding to said main control binary coded data, said subarithmetic control means comprising subarithmetic means which calculates said speed difference and produces a subcontrol binary coded data changed in accordance with a change in said speed difference, and subpulse generating means which produces continuous pulses applied to said subactuator and having a width which corresponds to said subcontrol binary coded data.

21. A speed maintaining device according to claim 20, wherein said main arithmetic means produces said main control binary coded data corresponding to a value of $$K_3 \cdot V_{SET} + K_4 \cdot \Delta V + K_5 \cdot (V_S - V_{SC}),$$

wherein:
- $V_{SET}$: said set speed
- $\Delta V$: said speed difference
- $V_S$: said subcontrol binary coded data
- $V_{SC}$: The central value of said subcontrol binary control data
- $K_3, K_4, K_5$: proportional constant.

22. A speed maintaining device according to claim 20, wherein said subarithmetic means produces said subcontrol binary coded data corresponding to a value of $$K_1 \cdot V_{SET} + K_2 \cdot \Delta V,$$

wherein
- $V_{SET}$: said set speed
- $\Delta V$: said speed difference
- $K_1, K_2$: proportional constant.

23. A speed maintaining device according to claim 20, wherein said subarithmetic control means comprises a converter inserted between said subpulse generating means and said auxiliary actuator for converting the continuous pulses to a current which is proportional to the widths of said continuous pulses.

* * * * *